United States Patent
David

(10) Patent No.: US 10,543,917 B2
(45) Date of Patent: Jan. 28, 2020

(54) FLYING DRONE COMPRISING TWO WINGS IN TANDEM TO WHICH PHOTOVOLTAIC CELLS ARE COUPLED

(71) Applicant: Benjamin David, Piriac sur Mer (FR)

(72) Inventor: Benjamin David, Piriac sur Mer (FR)

(*) Notice: Subject to any disclaimer, the term of this patent is extended or adjusted under 35 U.S.C. 154(b) by 313 days.

(21) Appl. No.: 15/406,001

(22) Filed: Jan. 13, 2017

(65) Prior Publication Data
US 2017/0197715 A1    Jul. 13, 2017

(30) Foreign Application Priority Data
Jan. 13, 2016 (FR) ...................... 16 50242

(51) Int. Cl.
| | |
|---|---|
| *B64C 39/02* | (2006.01) |
| *B64C 39/08* | (2006.01) |
| *B64C 3/00* | (2006.01) |
| *B64D 27/24* | (2006.01) |

(52) U.S. Cl.
CPC .............. *B64C 39/024* (2013.01); *B64C 3/00* (2013.01); *B64C 39/08* (2013.01); *B64D 27/24* (2013.01); *B64C 2201/021* (2013.01); *B64C 2201/042* (2013.01); *B64C 2201/066* (2013.01);
(Continued)

(58) Field of Classification Search
CPC ........ B64C 2201/021; B64C 2201/028; B64C 2201/04; B64C 2201/06; B64C 2201/066; B64C 2201/104; B64C 39/024; B64C 39/08
See application file for complete search history.

(56) References Cited

U.S. PATENT DOCUMENTS

| | | | | |
|---|---|---|---|---|
| 4,165,058 A | * | 8/1979 | Whitener | ................ B64C 39/08 244/15 |
| 4,390,150 A | * | 6/1983 | Whitener | ................ B64C 39/08 244/13 |

(Continued)

FOREIGN PATENT DOCUMENTS

| | | |
|---|---|---|
| CN | 101758926 A | 6/2010 |
| CN | 103895864 A | 7/2014 |

(Continued)

OTHER PUBLICATIONS

Web document from (www.sustainableskies.org/a-solar-algae-hybrid-for-an-atlantic-crossing/), Dean Sigler, Dec. 19, 2015, A Solar-Algae Hybrid for an Atlantic Crossing, pp. 1-9.*

(Continued)

*Primary Examiner* — Benjamin P Lee
(74) *Attorney, Agent, or Firm* — David D. Brush; Westman, Champlin & Koehler, P.A.

(57) ABSTRACT

A flying drone, which includes a fuselage; a propulsion powered at least by electrical accumulators and/or photovoltaic cells; and first and second wings. The first wing is defined by a wingspan and by an upper surface area, where the upper face of the first wing is essentially covered by photovoltaic cells. The second wing has practically the same wingspan and upper surface area as the first wing. The second wing is offset along the fuselage and in height relative to the first wing. The upper face of the second wing is essentially covered with photovoltaic cells.

9 Claims, 3 Drawing Sheets

(52) U.S. Cl.
CPC .... *B64C 2201/104* (2013.01); *B64D 2211/00* (2013.01); *Y02T 50/62* (2013.01)

(56) References Cited

U.S. PATENT DOCUMENTS

| | | | | |
|---|---|---|---|---|
| 6,378,803 | B1* | 4/2002 | Saiz | B64C 1/0009 244/36 |
| 9,559,632 | B2* | 1/2017 | Ahn | H02S 40/38 |
| 9,796,478 | B2* | 10/2017 | Ahn | H02S 10/40 |
| 2009/0292407 | A1* | 11/2009 | Minelli | B64C 27/26 701/3 |
| 2011/0168835 | A1* | 7/2011 | Oliver | B64C 29/0033 244/12.4 |
| 2011/0315809 | A1 | 12/2011 | Oliver | |
| 2015/0183518 | A1* | 7/2015 | Stuckl | B64C 3/10 244/13 |
| 2015/0256123 | A1* | 9/2015 | Ahn | H02S 40/38 136/246 |
| 2015/0344134 | A1* | 12/2015 | Cruz Ayoroa | B64C 29/0033 244/48 |
| 2017/0029129 | A1* | 2/2017 | Ahn | B64C 3/32 |

FOREIGN PATENT DOCUMENTS

| | | | | |
|---|---|---|---|---|
| CN | 204021254 U | 12/2014 | | |
| CN | 104890859 A | 9/2015 | | |
| DE | 655359 C | 10/1938 | | |
| DE | 19716650 A1 | 10/1998 | | |
| DE | 102012017533 A1 | 3/2014 | | |
| DE | 102013002720 A1 * | 8/2014 | ............... | B63B 1/26 |
| DE | 102013020601 A1 * | 6/2015 | ............... | B64C 3/10 |
| FR | 3061143 A1 * | 6/2018 | ........... | B64C 39/024 |
| JP | H045198 A | 1/1992 | | |
| WO | WO-2016028358 A2 * | 2/2016 | ......... | B64C 29/0033 |
| WO | WO-2018115724 A1 * | 6/2018 | ........... | B64C 39/024 |

OTHER PUBLICATIONS

French Search Report dated Jul. 12, 2017 based on French Patent Application No. 1650242, filed Jan. 13, 2016.

* cited by examiner

FLYING DRONE COMPRISING TWO WINGS IN TANDEM TO WHICH PHOTOVOLTAIC CELLS ARE COUPLED

CROSS-REFERENCE TO RELATED APPLICATIONS

This Application claims priority to and the benefit of French Patent Application No. FR 1650242, filed Jan. 13, 2016, the content of which is incorporated herein by reference in its entirety.

FIELD OF THE DISCLOSURE

The domain of the invention is the design and fabrication of flying drones.

The invention relates most particularly to fixed wing flying drones powered by photovoltaic cells.

BACKGROUND OF THE DISCLOSURE

Fixed wing flying drones correspond to drones driven by motors, and that comprise a wing that provides sufficient lift for the drone to fly, starting from a predetermined drone displacement speed. These "fixed wing" flying drones are in contrast with "rotating wing" flying drones for which lift is provided by one or several rotors.

Flying devices of this type may be small or large and propelled by different types of motor drives.

Drones equipped with a motor drive using electricity have the advantages of long endurance. For example, prior art discloses such drones designed to fly for a long period at high or medium altitude.

Electrical accumulators and photoelectric cells are used to supply electrical power to these drones. During the day, the photovoltaic cells are dedicated to the electrical power supply of the drone and to recharging the electrical accumulators. The electrical accumulators take over at night, so that the drone can continue to fly until the photovoltaic cells are once again exposed to sunshine.

Prior art discloses solutions for improving the endurance and load carrying capacity of a drone, by storing electrical energy collected from sunshine.

Thus, there are drones with a single fuselage and one supporting wing, covered with photovoltaic cells, with a very long wingspan relative to the length of the drone.

There are also drones with a plurality of fuselages arranged in parallel, supporting a long wingspan, the fuselages and the wing being covered entirely by photovoltaic cells.

This also includes flying drones with oversized devices so as to increase the drone area that can be covered with photovoltaic cells. Flying drones exist with an oversized tail fin.

These different solutions can increase the surface area of an aircraft on which photovoltaic cells can be coupled. However, these solutions induce many disadvantages.

Firstly, some drone architectures cause high structural stresses when the drone is in flight. These structural stresses may be the result of an excessive wingspan and require the use of high technicity composite materials. The structural stresses of these architectures are then accompanied by a large wingspan and a high manufacturing cost of flying drones.

Secondly, there are architectures that lead to bad placement of photovoltaic cells relative to the structural elements of the flying drone, consequently reducing the global sunshine to which photovoltaic cells coupled on this drone are exposed. For example, it is observed that architectures using multiple fuselages can create shadow zones on drone surfaces on which photovoltaic cells are installed. Therefore such architectures are prejudicial to the extent to which photovoltaic cells can be exposed to sunshine, even though these same photovoltaic cells add weight to the flying drone. Thus, there is a degradation to the performances and endurance of the flying drone designed with one of these architectures.

SUMMARY

An exemplary embodiment of the present disclosure relates to a flying drone comprising:
  a fuselage;
  propulsion means powered at least by electrical accumulators and/or photovoltaic cells;
  a first wing defined by a wingspan and by an upper surface area, the upper face of the first wing being essentially covered by photovoltaic cells;
characterised in that it comprises a second wing with:
  a wingspan practically the same as the span of the first wing;
  an upper face with practically the same surface area as the first wing; and in that the second wing is offset along the fuselage and in height relative to the first wing, the top face of the second wing being covered essentially by photovoltaic cells, and in that the cross-section of the fuselage is in the shape of an isosceles trapezium of which the small based is formed by the upper face of the fuselage starting from which the lateral faces of the fuselage extend, the top face and lateral faces of the fuselage being essentially covered by photovoltaic cells.

In particular, the two wings of the flying drone according to the invention are practically the same shape as seen from top views.

More precisely, these wings occupy a position known by the expression "wings in tandem".

Such a flying drone has better endurance performances in flight that is possible according to prior art. The surface of the drone according to the invention is covered by a larger area of photovoltaic cells that drones disclosed in prior art with a single wing with a wingspan equivalent to the span of the wings of the drone according to the invention.

More precisely, this architecture can increase the in-flight endurance of the drone by increasing its ability to capture solar energy to supply power to its propulsion means and to recharge its batteries during the day, when the photovoltaic cells are exposed to sunshine. This increase in the ability to capture energy is possible particularly due to the tandem layout of the wings that limits problems of shadows formed by one wing on the other wing.

This optimisation of the endurance performances of the drone is coupled to a drone shape that limits its size and limits the occurrence of structural stresses.

This wing configuration in tandem can limit the wingspan of the drone. Thus, a drone according to the invention can carry the same number of photovoltaic cells but with a smaller wingspan and dimensions than a drone according to prior art with a single wing with a total area comparable to the total area of the wings of the drone according to the invention.

This limitation of the drone wingspan avoids structural stresses induced by the presence of a single wing with a large wingspan.

Consequently, the flying drone according to the invention has less need for specific and expensive materials with low weight and capable of resisting high structural stresses.

Otherwise, the top face and the lateral faces of the fuselage are each exposed to the sky and contribute to the generation of electricity by means of the photovoltaic cells that cover them.

According to one advantageous characteristic, the wings have a "straight" shape.

The flying drone thus has an architecture adapted to subsonic speeds.

According to another advantageous characteristic, the front view of the first wing is in the form of a negative or positive dihedron, and the front view of the second wing is in the form of a positive dihedron.

This design improves the stability of the flying drone in flight.

Preferably, the second wing is coupled to the fuselage through a V-shaped connecting arm, the second wing being located above the fuselage.

Such a connecting arm allows air to pass between the fuselage and the second wing that is higher than the fuselage. This improves the aerodynamic properties of the drone and the drag of the drone is reduced, while maintaining the structural stiffness of the upper wing on the fuselage.

Advantageously, a panel of photovoltaic cells is coupled and centred on the top face of the fuselage, the panel of photovoltaic cells extending practically along the entire length of the fuselage.

According to one variant embodiment, the width of the panel of photovoltaic cells is equal to the width of the fuselage.

According to another variant embodiment, the width of the panel of photovoltaic cells is larger than the width of the fuselage, and its profile is symmetric and it has zero lift when the angle of incidence is zero.

Such a panel increases the capacity of the flying drone to retrieve a maximum of solar illumination. Its profile is such that its lift and thus its induced drag are minimum when the angle of incidence is zero.

According to another embodiment, the flying drone comprises at least one pair of profiled panels of photovoltaic cells distinct from the wings, the profiled panels of each pair being coupled on the fuselage and distributed symmetrically on the two sides of the fuselage, and each profiled panel is cambered with lift at a predetermined speed and cruising altitude of the flying drone that can compensate for the weight of said profiled panel when the angle of incidence is zero.

Due to such profiled panels, the flying drone has additional photovoltaic cells for which the support (the profiled panel) makes it possible to compensate for its weight due to its aerodynamic shape when the flying drone is at its cruising altitude and cruising speed.

Advantageously, the pair(s) of profiled panels are offset in height on the fuselage relative to the first wing and to the second wing.

In this way, turbulence generated by the wings and/or the profiled panels has a minimum impact on downstream structures in the air flow.

Preferably, the flying drone comprises two pairs of profiled panels of photovoltaic cells distinct from the wings, including a forward pair and an aft pair, and:
- the forward pair is located between the second wing and the first wing located on a forward end of the fuselage;
- the aft pair is located between the second wing and an aft end of the fuselage;

Thus, the use of four profiled panels minimises shadows on profiled panels due to the second wing.

Furthermore in this configuration, the heights of the forward pair and the aft pair can be offset from each other so as to minimise the impact of turbulence caused by the forward pair on the aft pair.

According to one advantageous characteristic, the fuselage comprises a compartment for a payload at the forward end of the fuselage, in front of the wings.

For example, the payload could be a camera. The compartment can then consist of a transparent cell located along the extension of the fuselage so as to be as aerodynamic as possible.

Due to this arrangement forward from the two wings, the fuselage structure can be optimised to give better resistance to torsion forces applied between the two wings. Thus, there is no structural discontinuity in the section of the fuselage between the two wings due to the formation of a compartment in which a payload can be placed.

This arrangement also makes it possible to position the payload forward from the centre of lift of the flying drone, thus improving the stability of the drone in flight.

According to one particular embodiment, the flying drone includes at least one lower face on which photovoltaic cells are fitted.

The albedo of the earth (brightness reflected from the earth's surface) can be collected by these photovoltaic cells located on at least one lower face of the flying drone. The drone thus equipped is particularly suitable for long duration missions in regions covered with snow or ice (since snow and ice are surfaces with a good capability of reflecting light intensity).

BRIEF DESCRIPTION OF THE DRAWINGS

Other characteristics and advantages of the invention will become clearer after reading the following description of embodiments of the invention given as illustrative and non-limitative examples, and the appended drawings among which.

DETAILED DESCRIPTION OF ILLUSTRATIVE EMBODIMENTS

As illustrated in FIGS. 1, 2, 4, 6 to 10, the flying drone 1 according to the invention comprises a fuselage 2 and two wings arranged in tandem. This fuselage comprises a single body and is oblong in shape.

More precisely, the flying drone 1 comprises a first wing 4 and a second wing 5. These two wings have practically the same shape. The first wing has an upper surface defined by a wingspan and a surface area that are practically the same as the wingspan and the surface area defined by the upper surface of the second wing. These two wings are offset along the fuselage and in height relative to each other.

Figure 1:
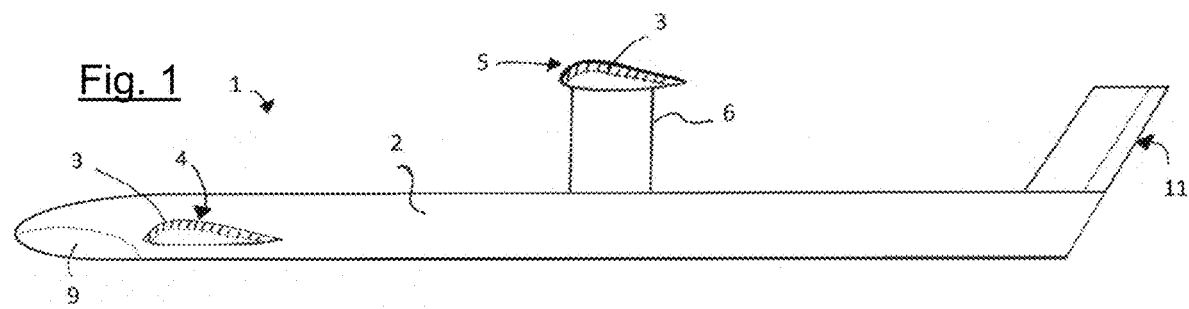
FIGS. 1 and 2 are diagrammatic elevation and front views respectively of a first embodiment of the flying drone according to the invention.
Figure 8:
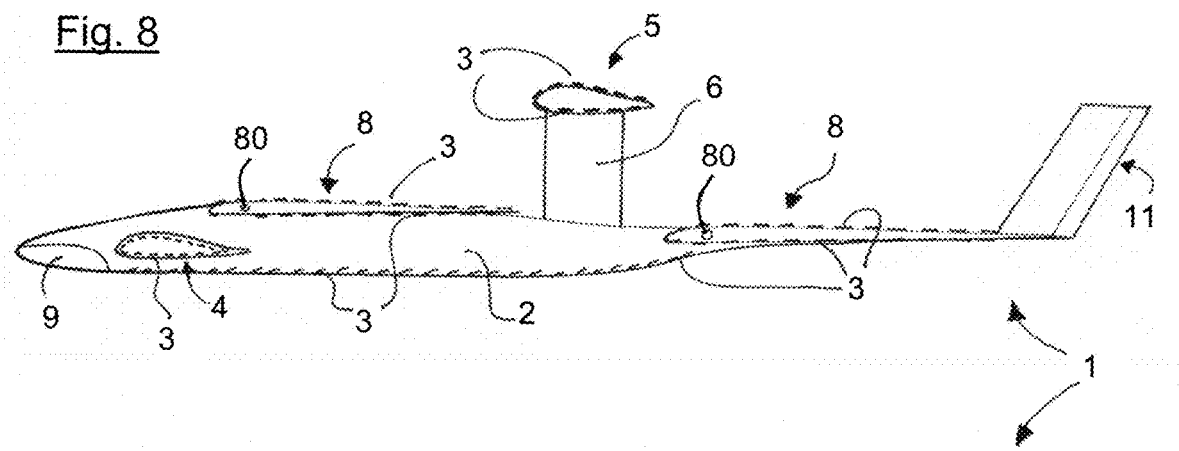
FIGS. 8, 9 and 10 are diagrammatic elevation, front and top views respectively of a third embodiment of the flying drone according to the invention.

As can be seen on FIGS. 1 and 8, the first wing 4 is located at the forward end of the fuselage 2 while the second wing is approximately at the centre of the fuselage, and above this fuselage.

Figure 2:
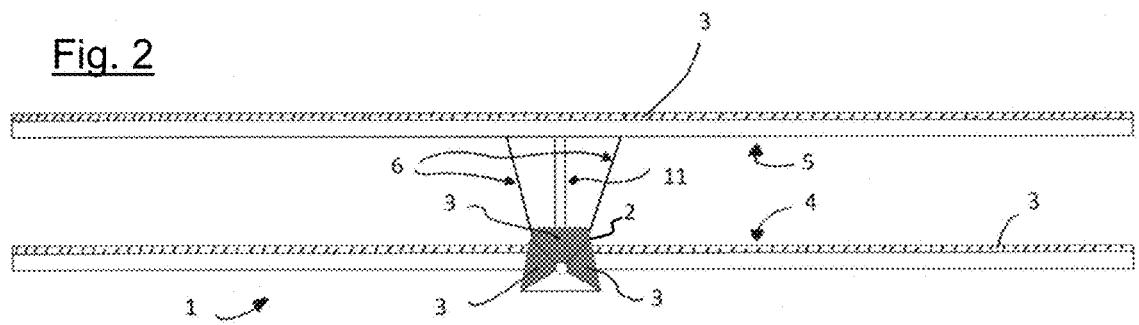
Figure 6:
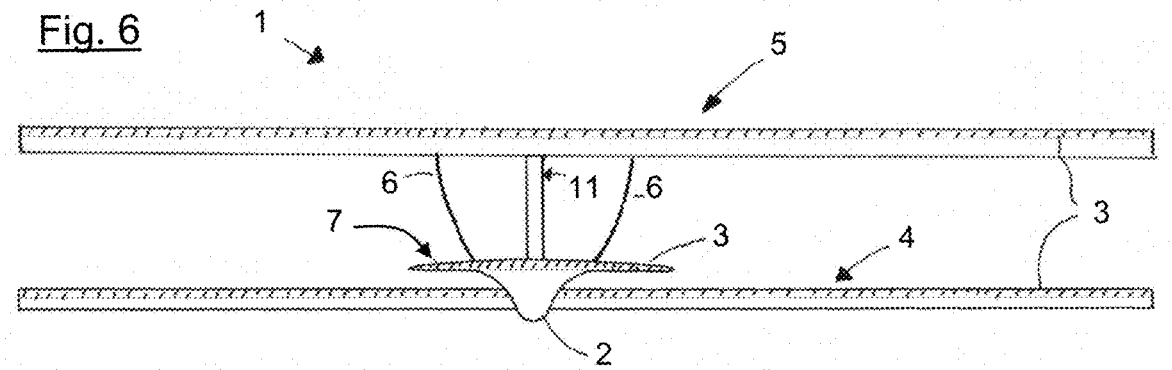
FIGS. 6 and 7 are diagrammatic front and top views respectively of a second embodiment of the flying drone according to the invention.
Figure 9:
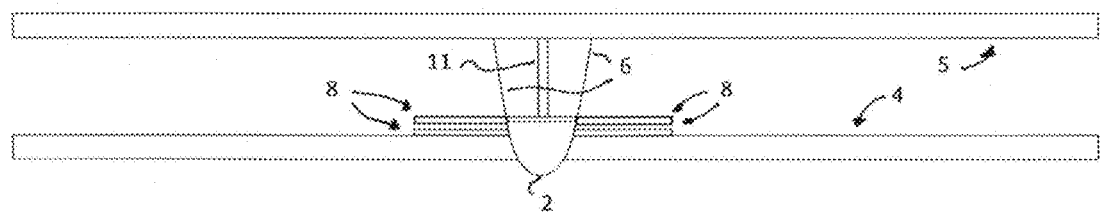

In particular, the second wing is coupled to the fuselage through a connecting arm 6. As illustrated in FIGS. 2, 6 and 9, the connecting arm is V-shaped. With such a connecting arm, air can circulate more freely between the second pair of wings and the fuselage.

Figure 4:
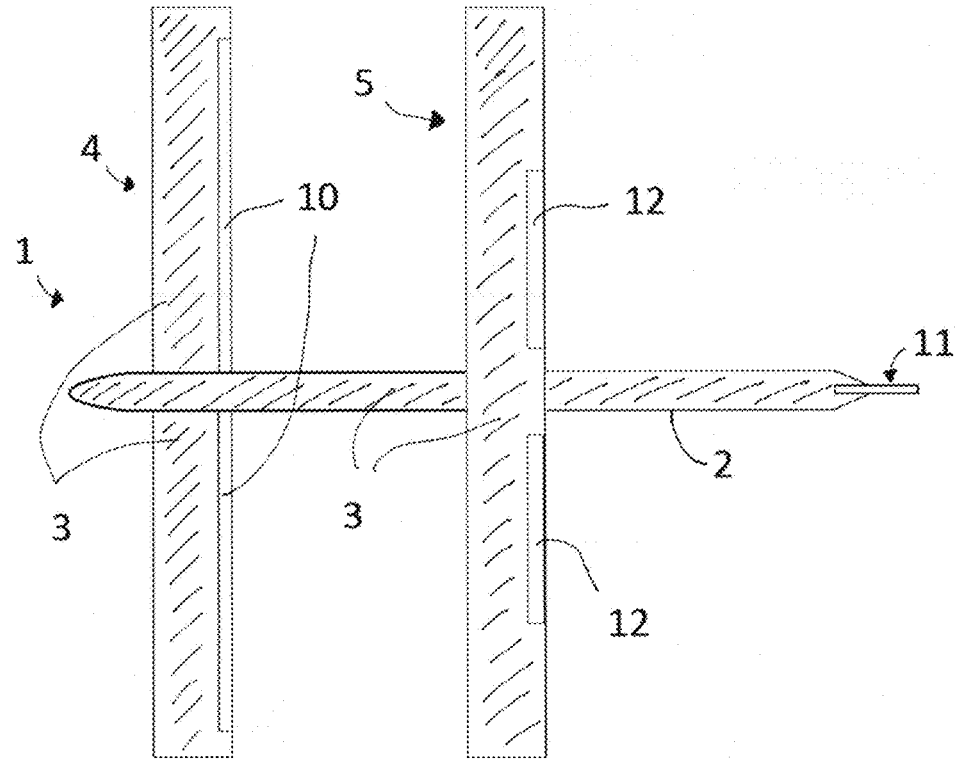
FIG. 4 is a diagrammatic top view of the first embodiment of the flying drone according to the invention.
Figure 7:
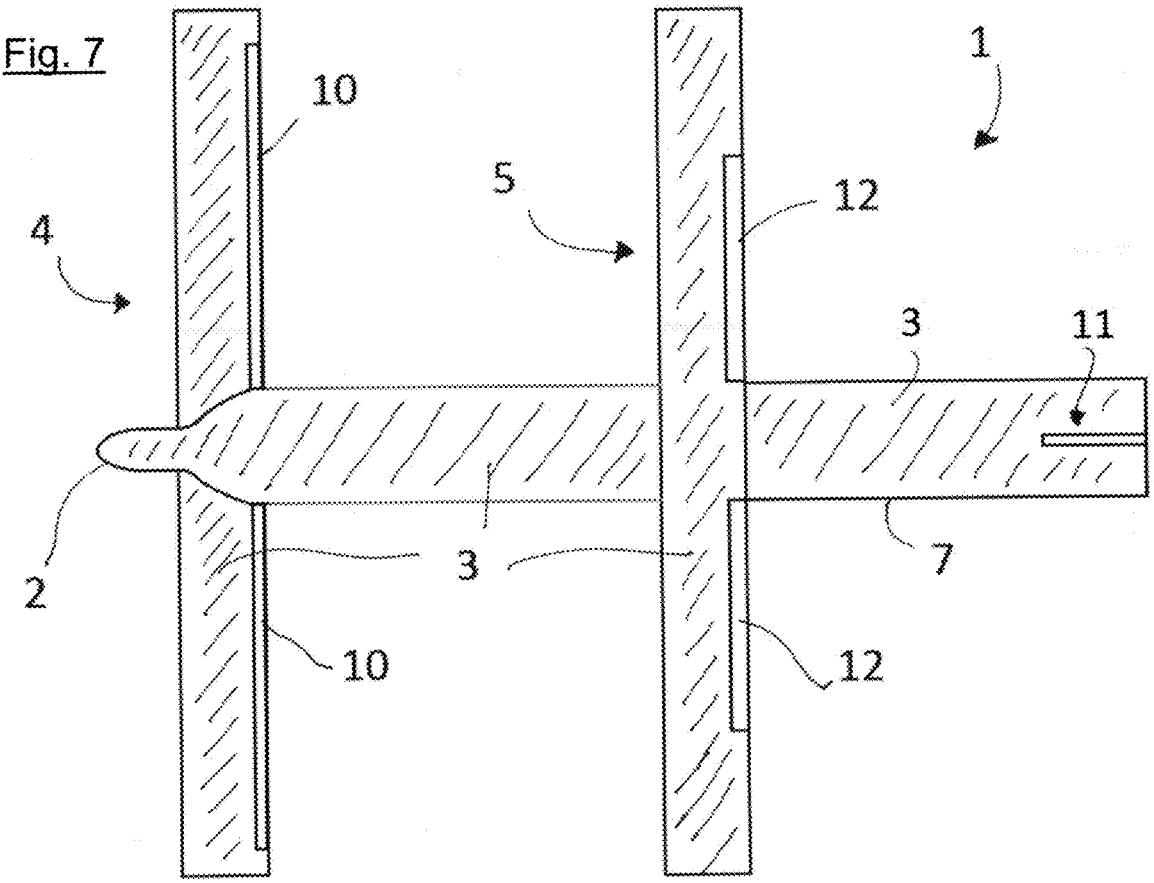
Figure 10:
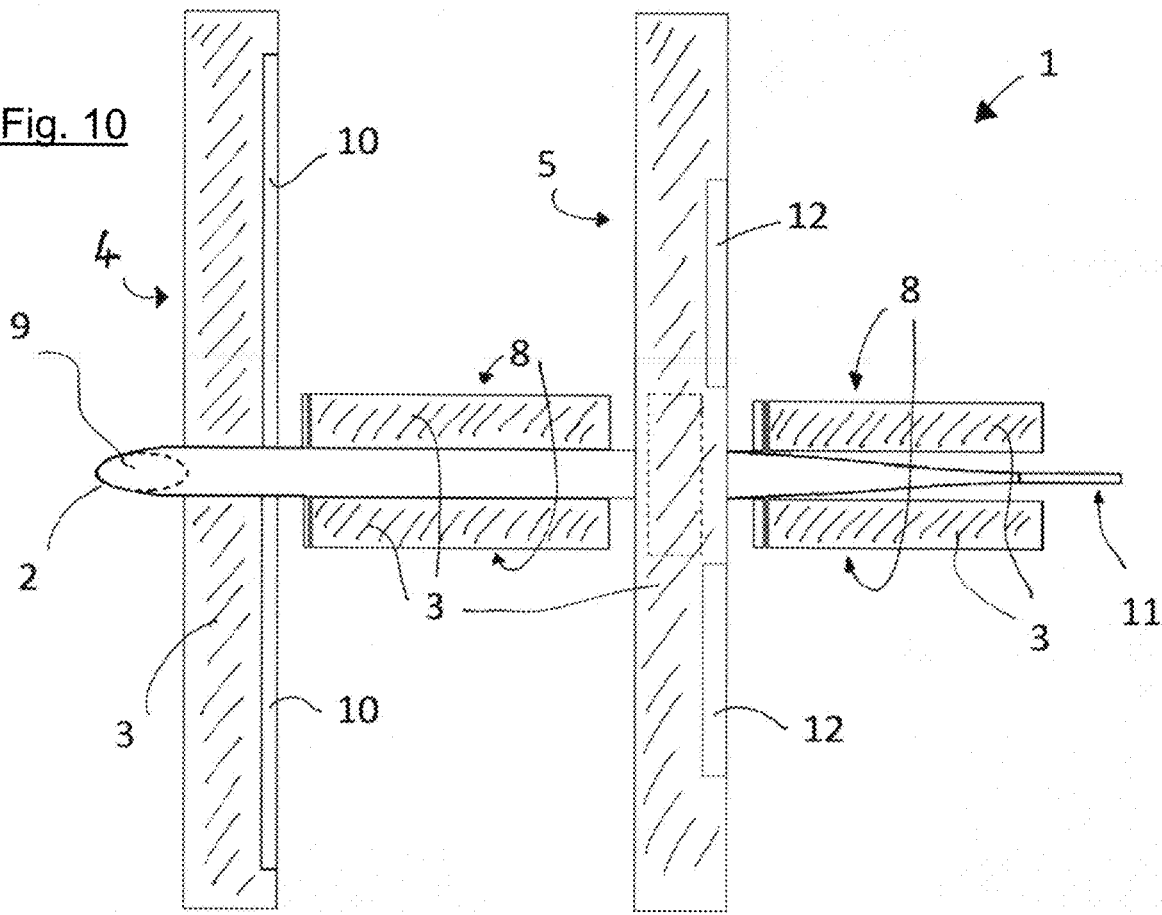

As can be seen on FIGS. 4, 7 and 10, the first wing 4 has elevators 10, the fuselage 2 has a rudder 11 at its aft end, and the second wing 5 carries ailerons 12.

The flying drone is provided with propulsion means (not shown) powered at least by electrical accumulators and/or photovoltaic cells 3. These propulsion means may be in the form of one or several electric motors with propellers coupled to the fuselage and/or wings.

The photovoltaic cells 3 enable the flying drone 1 to supply power to its propulsion means and recharge its electric accumulators when they are exposed to sunshine.

The wings arranged in tandem can increase the total surface area of the drone facing upwards.

Thus, as illustrated in FIGS. 1, 2, 4, 6 to 10, the upper surface of the first wing 4 and the upper surface of the second wing 5 are essentially covered by photovoltaic cells 3. The tandem configuration helps to limit possible shadows due to the second wing that is higher than the first wing relative to the fuselage.

The drone according to the invention makes it possible to optimise the total surface area that can be covered with photovoltaic cells.

Figure 3:
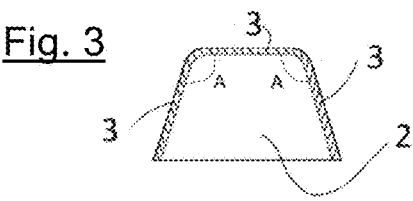
FIG. 3 is a diagrammatic cross-sectional view of a first type of fuselage of a flying drone according to the invention.

Thus, according to a first embodiment illustrated in FIGS. 2 to 4, the fuselage 2 has a cross-section in the form of an isosceles triangle. The smallest base of this trapezium is formed by the upper face of the fuselage 2, starting from which the lateral faces of the fuselage extend. This upper face and these lateral faces of the fuselage are then essentially covered with photovoltaic cells 3.

As can be seen on FIG. 3, corners A are formed by the upper face and the lateral faces of the fuselage. These corners A are designed so as to optimise the average exposure to sunshine of the photovoltaic cells 3 located on the upper and lateral faces of the fuselage.

Figure 5:
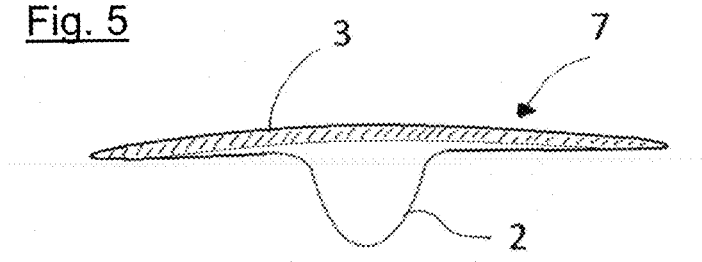
FIG. 5 is a diagrammatic cross-sectional view of a second type of fuselage of a flying drone according to the invention.

According to a second embodiment illustrated in FIGS. 5 to 7, the flying drone 1 comprises a panel 7 of photovoltaic cells 3, coupled and centred on the upper face of the fuselage 2. This panel of photovoltaic cells extends essentially along the entire length of the fuselage.

According to this embodiment, the width of the panel 7 is larger than the width of the fuselage 2. This panel has a symmetric profile with zero lift when the angle of incidence is zero.

As can be seen on FIG. 6, the fuselage 2 has lateral faces and a lower face such that the transverse profile of the lower face is curved downwards. The V-shaped connecting arm 6 is then located along the continuation of the lateral faces of the fuselage. More precisely, the connecting arm has two parts, each of which is coupled on the fuselage at the upper end of a lateral face and extending upwards from the fuselage, the distance between the two parts increasing with increasing distance from the fuselage. The fuselage thus has a U- or V-shaped transverse profile extending this shape upwards.

In this way, the connecting arm is connected to the fuselage more naturally and the aerodynamic properties of the drone and the structural stresses applied to the drone are optimised.

According to a third embodiment illustrated in FIGS. 8 to 10, the flying drone 1 comprises two pairs of profiled panels 8 of photovoltaic cells 3, distinct from the wings.

The profiled panels of each pair are symmetrically distributed and coupled on each side of the fuselage.

In particular, the profiled panels are coupled on the fuselage through rotation axes 80 around which they are free to move. The angle of incidence of each profiled panel can be modified as a result of these rotation axes. More precisely, the profile of these profiled panels is cambered and confer sufficient lift on the profiled panels to compensate for the weight of the profiled panel when the angle of incidence is zero, at a predetermined cruising speed and cruising altitude.

It can be seen on FIG. 9 that the pairs of profiled panels 8 are essentially offset in height relative to each other on the fuselage 2 and relative to the first wing 4 and to the second wing 5. Starting from the bottom part of the flying drone 1, in sequence there is the first wing 4, a first pair of profiled panels 8 and then a second pair of profiled panels at the upper end of the fuselage 2, and finally the second wing 5 located above the fuselage.

As can be observed on FIGS. 8 and 10, the two pairs of profiled panels 8 consist of a forward pair and an aft pair, the forward pair being located being the second wing and the first wing, and the aft pair being located between the second wing and the aft end of the fuselage. Thus as illustrated in FIG. 10, the upper surfaces of the wings and the profiled panels are not superposed with each other. The photovoltaic cells 3 located on these profiled panels 8 thus tend to be less in the shadow of the wings.

Finally, according to a fourth embodiment illustrated by FIG. 8, the flying drone 1 has photovoltaic cells 3 on at least one lower face to be able to collect the albedo of the earth. More precisely, the lower face of the fuselage 2, the lower faces of the first wing 4 and the second wing 5, and the lower faces of the profiled panels 8 are fitted with photovoltaic cells 3.

Obviously, these characteristics can be combined with each other so as to increase the total surface area of the flying drone that can be covered with photovoltaic cells.

Thus for example, if the cross-section of the fuselage of the flying drone is in the form of an isosceles trapezium (the lateral faces being fitted with photovoltaic cells), the drone can be fitted with profiled panels of photovoltaic cells. In this case, these profiled panels are preferably coupled in a low position on the lateral faces to avoid creating too much shadow on these lateral faces covered with photovoltaic cells.

Finally, in the embodiment illustrated on FIGS. 1 and 8, the fuselage 2 has a compartment 9 in which a payload can be placed. This compartment 9 is located at the front end of the fuselage, forward from the wings such that the presence of the compartment does not create structural stresses in the fuselage between the two wings.

An exemplary embodiment of the present disclosure overcomes the disadvantages of prior art described above.

An exemplary embodiment discloses a flying drone with fixed wing and electrical power supply by photovoltaic cells with better endurance performance than is possible according to prior art.

An exemplary embodiment discloses such a flying drone that is smaller than drones with equivalent endurance disclosed in prior art.

An exemplary embodiment discloses such a flying drone with an architecture that introduces few structural constraints and to optimise its ability to store electrical energy through the use of photovoltaic cells.

Although the present disclosure has been described with reference to one or more examples, workers skilled in the art will recognize that changes may be made in form and detail without departing from the scope of the disclosure and/or the appended claims.

The invention claimed is:

1. A flying drone comprising:
a single-bodied fuselage;
a propulsion device powered at least by electrical accumulators and/or photovoltaic cells;
a first wing defined by a wingspan and by an upper surface with a surface area, the upper surface of the first wing being substantially covered by photovoltaic cells;
a second wing comprising:
a wingspan substantially the same as the wingspan of the first wing;
an upper surface with substantially the same surface area as the first wing;
wherein the second wing is offset along the fuselage and in height relative to the first wing, the upper surface of the second wing being covered substantially by photovoltaic cells,
wherein a cross-section of the fuselage is in the form of an isosceles trapezium for which the smallest base is formed from an upper surface of the fuselage from which the lateral faces of the fuselage extend, the upper surface and the lateral faces of the fuselage being then substantially covered with photovoltaic cells, and
wherein each of the upper surface and the lateral faces of the fuselage are substantially planar.

2. The flying drone according to claim 1, wherein the second wing is coupled to the fuselage through a V-shaped connecting arm, the second wing being located above the fuselage.

3. The flying drone according to claim 1, wherein a panel of the photovoltaic cells is coupled and centred on the upper surface of the fuselage, the panel of photovoltaic cells extending practically along the entire length of the fuselage.

4. The flying drone according to claim 3, wherein the panel of photovoltaic cells has a width larger than a width of the fuselage,
and the panel of photovoltaic cells has a symmetric profile with zero lift when an angle of incidence is zero.

5. The flying drone according to claim 1, further comprising least one pair of profiled panels of photovoltaic cells distinct from the wings, the profiled panels of each pair being coupled on the fuselage and distributed symmetrically on the two sides of the fuselage,
and wherein a profile of each of these profiled panels is cambered and confers sufficient lift on the profiled panels to compensate for a weight of said profiled panel when an angle of incidence is zero, at a predetermined cruising speed and cruising altitude.

6. The flying drone according to claim 5, wherein the at least one pair of profiled panels is offset in height on the fuselage relative to the first wing and to the second wing.

7. The flying drone according to claim 5, wherein the drone comprises two pairs of the profiled panels of photovoltaic cells distinct from the wings, including a forward pair and an aft pair,
and wherein:
the forward pair is located between the second wing and the first wing located on a forward end of the fuselage;
the aft pair is located between the second wing and an aft end of the fuselage.

8. The flying drone according to claim 1, wherein the fuselage comprises a compartment for a payload at the forward end of the fuselage, in front of the wings.

9. The flying drone according to claim 1, wherein the drone further comprises at least one lower surface supporting photovoltaic cells.

* * * * *